United States Patent
Zhang

(10) Patent No.: US 12,139,364 B2
(45) Date of Patent: Nov. 12, 2024

(54) CONVEYING SYSTEM AND BATTERY PRODUCTION SYSTEM

(71) Applicant: CONTEMPORARY AMPEREX TECHNOLOGY (HONG KONG) LIMITED, Hong Kong (CN)

(72) Inventor: Cai Zhang, Ningde (CN)

(73) Assignee: CONTEMPORARY AMPEREX TECHNOLOGY (HONG KONG ) LIMITED, Hong Kong (CN)

( * ) Notice: Subject to any disclaimer, the term of this patent is extended or adjusted under 35 U.S.C. 154(b) by 8 days.

(21) Appl. No.: 18/178,550

(22) Filed: Mar. 6, 2023

(65) Prior Publication Data
US 2023/0286764 A1    Sep. 14, 2023

(30) Foreign Application Priority Data

Mar. 9, 2022    (CN) .......................... 202220504418.6

(51) Int. Cl.
*B65H 5/06*    (2006.01)
*H01M 4/04*    (2006.01)

(52) U.S. Cl.
CPC .......... *B65H 5/062* (2013.01); *H01M 4/0435* (2013.01); *B65H 2404/111* (2013.01); *B65H 2404/144* (2013.01)

(58) Field of Classification Search
CPC ............ B65H 2404/111; B65H 49/325; B65H 2301/41306; B65H 2301/41369
See application file for complete search history.

(56) References Cited

U.S. PATENT DOCUMENTS

| | | | | |
|---|---|---|---|---|
| 5,476,437 | A | * 12/1995 | Damour | B65H 23/0255 492/47 |
| 9,677,211 | B1 | * 6/2017 | Damour | B65H 27/00 |
| 9,932,694 | B2 | * 4/2018 | Weinhold | D01D 10/0436 |

(Continued)

FOREIGN PATENT DOCUMENTS

| | | |
|---|---|---|
| CN | 201572730 U | 9/2010 |
| CN | 205823957 U * | 12/2016 |

(Continued)

OTHER PUBLICATIONS

The extended European search report received in the counterpart European application 23160545.2, mailed Aug. 8, 2023.

*Primary Examiner* — Howard J Sanders
(74) *Attorney, Agent, or Firm* — Kilpatrick Townsend & Stockton LLP

(57) ABSTRACT

A conveying system and a battery production system are provided. The conveying system is used for sheet conveying, and includes: a driving roller making contact with a sheet; and a press roller arranged correspondingly to the driving roller, the press roller abutting against at least part of the surface of the sheet facing away from the driving roller and pressing the sheet against the driving roller. The press roller includes: a main shaft with a central axis; at least one hollow rubber roller detachably sleeving the main shaft; and at least one pair of fixing clamp rings arranged on two sides of the hollow rubber roller along the central axis so as to fix the position of the hollow rubber roller on the main shaft along the central axis, where an outer diameter of the fixing clamp ring is less than that of the hollow rubber roller.

8 Claims, 4 Drawing Sheets

(56) References Cited

U.S. PATENT DOCUMENTS

| | | |
|---|---|---|
| 2005/0020422 A1 | 1/2005 | Betti et al. |
| 2014/0113784 A1 | 4/2014 | Sheridan |
| 2017/0036215 A1 | 2/2017 | Willemsen |
| 2018/0364616 A1* | 12/2018 | Funada .................. B65H 5/062 |

FOREIGN PATENT DOCUMENTS

| | | |
|---|---|---|
| CN | 108539242 A | 9/2018 |
| DE | 202014003409 U1 | 4/2014 |
| WO | 03045679 A1 | 6/2003 |

* cited by examiner

CONVEYING SYSTEM AND BATTERY PRODUCTION SYSTEM

CROSS REFERENCE TO RELATED APPLICATIONS

The present application claims to a Chinese Application 202220504418.6, filed Mar. 9, 2022 and entitled "CONVEYING SYSTEM AND BATTERY PRODUCTION SYSTEM", the entire disclosure of which is incorporated herein by reference.

TECHNICAL FIELD

The present application relates to the field of batteries, and in particular to, a conveying system and a battery production system.

BACKGROUND

With energy conservation and emission reduction being the key to the sustainable development of automobile industry, electric vehicles have become an important part of the sustainable development of automobile industry due to their advantages in energy conservation and environmental protection. For the electric vehicles, a battery technology is an important factor related to their development.

During battery production, a conveying system is needed to convey sheets. However, the existing conveying system is poor in universality, high in cost and is likely to damage the sheets in a sheet conveying process, which difficultly meets production needs of high-performance batteries.

SUMMARY

The present application aims to at least solve one of technical problems in the prior art. Therefore, an objective of the present application is to provide a conveying system in order to improve universality and conveying quality of the conveying system.

In a first aspect, the embodiment of the present application provides a conveying system used for sheet conveying, including:
a driving roller making contact with a sheet; and
a press roller arranged correspondingly to the driving roller, the press roller abutting against at least part of the surface of the sheet facing away from the driving roller and pressing the sheet against the driving roller:
where the press roller includes: a main shaft with a central axis; at least one hollow rubber roller detachably sleeving the main shaft; and at least one pair of fixing clamp rings arranged on two sides of the hollow rubber roller along the central axis so as to fix the position of the hollow rubber roller on the main shaft along the central axis, and an outer diameter of the fixing clamp ring is less than that of the hollow rubber roller.

In the technical solution of the embodiment of the present application, the number and the positions of the hollow rubber rollers included in the press roller can be adjusted, and the width and the outer diameter of the hollow rubber rollers can be combined, which enhances the adaptability between the press roller and the sheet; the matching of the hollow rubber rollers and the specification of the sheet reduces the damage caused by the press roller to the sheet, also improves the universality of the conveying system when different types and specifications of sheets are conveyed, and widens the application range of the conveying system; and at the same time, the hollow rubber rollers are detachable, which facilitates the replacement and rapid assembly of the press roller, reduces the die replacement cost, reduces the maintenance cost of the conveying system, and prolongs service life of the conveying system.

In some embodiments, the conveying system further includes a fastener including:
at least one main shaft groove formed in an outer circumferential surface of the main shaft and extending along the central axis:
at least one rubber roller groove formed in an inner circumferential surface of the hollow rubber roller; and
at least one key clamped in the main shaft groove and the rubber roller groove so as to limit the rotation of the hollow rubber roller relative to the main shaft.

The fastener ensures stable radial connection between the hollow rubber rollers and the main shaft, also facilitates the assembly and cooperation between the main shaft and the hollow rubber rollers, has a characteristic of rapid offline assembly, facilitates quick switching of press roller types, and improves transformation efficiency.

In some embodiments, each fixing clamp ring includes a first half-ring part, a second half-ring part and fastening bolts, where the fixing clamp ring is defined by the first half-ring part and the second half-ring part, and the fastening bolts are used for connecting the first half-ring part and the second half-ring part.

The fixing clamp rings guarantee stable longitudinal connection of the hollow rubber rollers and the main shaft, and further ensure rotation stability of the press roller during operation.

In some embodiments, the press roller further includes:
first protective enclosures each including a circumferential part covering an outer circumferential surface of the corresponding fixing clamp ring and a radial part covering the side surface of the fixing clamp ring facing away from the hollow rubber roller, where the circumferential part abuts against the side surface of the hollow rubber roller, and the radial part abuts against the outer circumferential surface of the main shaft; and/or
second protective enclosures which sleeve the main shaft at one or more positions that are not in contact with the hollow rubber roller and are provided with the main shaft groove.

The protective enclosures can avoid a situation that dust and other pollutants enter the main shaft grooves and the rubber roller grooves, as a result, influence operation efficiency, and shorten service life of the press roller and the conveying system.

In some embodiments, the press roller includes multiple groups of hollow rubber rollers different in outer diameter; and/or the multiple groups of hollow rubber rollers are different in width.

The multiple groups of hollow rubber rollers with different outer diameters and/or widths increase adaptability of the press roller and the conveying system to different types and specifications of sheets, enlarge the application range of the conveying system, and improve conveying efficiency.

In some embodiments, the hollow rubber roller includes an inner-ring part and an outer-ring part, and the outer circumferential surface of the inner-ring part is detachably sleeved with the outer-ring part.

The above setting facilitates replacement of the outer-ring parts of the hollow rubber rollers, and reduces the usage cost, and different outer-circle materials can be selected according to different types of sheets, which improves universality of the press roller and the conveying system.

In some embodiments, the conveying system further includes a distance adjustment mechanism, and the distance adjustment mechanism is connected to the press roller and adjusts a distance between the press roller and the driving roller so as to adjust a pressure applied by the press roller to a to-be-conveyed sheet.

The distance adjustment mechanism can further improve universality of the conveying system so as to be matched with conveying of different types of sheets and more effectively matched with adjustment of tensity of a sheet production technology.

In some embodiments, the conveying system further includes at least one bypass roller arranged upstream and/or downstream of the driving roller and the press roller in a sheet conveying direction.

The bypass rollers are matched with the conveying system to form a sheet tension isolation system used for adjusting the tensity of a battery pole piece production technology.

In some embodiments, the diameter of the driving roller is greater than that of the hollow rubber roller.

The driving roller serving as an active roller has the larger diameter than the hollow rubber rollers serving as driven rollers, which can guarantee a large contact area between the sheet and the driving roller, make large friction force generated between the sheet and a circumferential surface of the driving roller, and ensure balanced stress of the sheet, thereby stably conveying the sheet. By contrast, the hollow rubber rollers serving as the driven rollers are set to have the small diameter, which can reduce a weight of the hollow rubber rollers and reduce a contact area between the sheet and the hollow rubber rollers, thereby ensuring that the hollow rubber rollers press the sheet against the driving roller and meanwhile producing small resistance to conveying.

In a second aspect, the embodiment of the present application provides a battery production system including the conveying system in the above embodiment.

The battery production system can improve the battery production quality, reduce the damage caused by the conveying system to battery components in the conveying process, avoid a risk of strip breakage during cold-pressing rolling caused by concave-convex points generated in an empty foil area of a pole piece due to dirt on the rubber rollers in the pole piece conveying process, and improve a yield.

The above description is only a summary of the technical solutions of the present application. In order to understand the technical means of the present application more clearly, the technical means can be implemented according to the content of the specification. Furthermore, to make the above content and other objectives, features and advantages of the present application more comprehensible, specific embodiments of the present application are exemplified below.

DESCRIPTION OF DRAWINGS

In the drawings, unless otherwise specified, like reference numerals indicate like or similar parts or elements throughout multiple drawings. The drawings are not necessarily drawn to scale. It should be understood that the drawings depict only some embodiments disclosed according to the present application, and should not be regarded as limitations to the scope of the present application.

Figure 1:
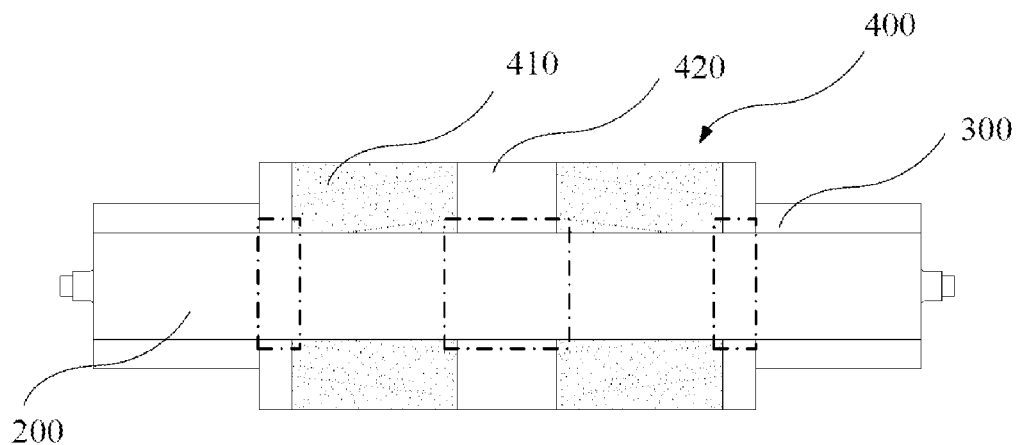
FIG. 1 is a structural schematic diagram of a conveying system according to the related prior art of the present application.

DESCRIPTION OF REFERENCE NUMERALS existing conveying system 100, integrated press roller 200, driving roller 300, pole piece 400, membrane 410, and empty foil area 420;

conveying system 10, press roller 20, main shaft 21, hollow rubber roller 22, inner-ring part 221, outer-ring part 222, and main shaft groove 23: fixing clamp ring 24, first half-ring part 241, second half-ring part 242, fastening bolt 243, threaded hole 244, first protective enclosure 25, key 26, bypass roller 27, driving roller 30, pole piece 40, membrane 41, and empty foil area 42.

DETAILED DESCRIPTION

Embodiments of technical solutions of the present application are described in detail below in conjunction with drawings. The following embodiments are only used for more clearly illustrating the technical solutions of the present application, and therefore are only used as examples but cannot be used for limiting the scope of protection of the present application.

Unless otherwise defined, all technical and scientific terms used herein have the same meaning as commonly understood by those of ordinary skill in the art belonging to the technical field of the present application: the terms used herein are only for the purpose of describing the specific embodiments and are not intended to limit the present application: the terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive from other embodiments. It is explicitly and implicitly understood by those skilled in the art that the embodiments described herein may be combined with other embodiments.

In the description of the embodiments of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "anticlockwise", "axial direction", "radial direction", "circumferential direction", etc. are based on the orientation or position relationship shown in the drawings and are intended to facilitate the description of the embodiments of the present application and simplify the description only, rather than indicating or implying that a device or element referred to must have a particular orientation or be constructed and operated in a particular orientation, and therefore are not to be understood as limitations on the embodiments of the present application.

In the description of the embodiments of the present application, unless otherwise expressly specified and limited, the technical terms "mount", "join", "connect", "fix", etc. should be understood in a broad sense, such as, a fixed connection, a detachable connection, or an integrated connection; a mechanical connection, or an electrical connection; a direct connection, an indirect connection through an intermediate medium, an internal connection of two elements, or interaction between two elements. Those of ordinary skill in the art can understand specific meanings of the above terms in embodiments of the present application according to specific situations.

During battery production, various sheets need to be used. As one kind of sheets used, a pole piece is a carrier for charging and discharging of a lithium-ion battery. Pole piece processing often requires a plurality of procedures such as slurry preparation, precision coating, cold pressing of the pole piece, tab die cutting and slitting into strips, and therefore the conveying quality of the pole piece has an important influence on battery performance.

The prior art discloses a conveying system 100 for conveying sheets such as a pole piece. Referring to FIG. 1, the conveying system 100 conveys a pole piece 400 through an integrated press roller 200. A working principle of the conveying system 100 is that a driving roller 300 generates downward traction force under the action of a motor, at the same time, the integrated press roller 200 acts on the pole piece 400 to make the pole piece 400 closely attached to the driving roller 300, and the pole piece 400 is driven to advance under the action of friction force. The inventor of the present application has noticed that such a conveying manner is likely to cause damage to the pole piece 400. Specifically, a base material of the pole piece 400 is usually a metal foil, such as a copper or aluminum film, on which there are membranes 410 coated with an electrode active material and an empty foil area 420 not coated with an active material. In the empty foil area 420, tabs can be cut out. In a rolling process, if the empty foil area 420 or areas on edges of the membranes 410 (areas shown by dotted lines in FIG. 1) on which the integrated press roller 200 acts have large particles of foreign matter remaining, the integrated press roller 200 presses the pole piece 400, the particles act on the empty foil area 420 of the pole piece 400, and as a result, the empty foil area 420 will produce concave and convex points; and the pole piece 400 is pulled to a next cold pressing procedure and is prone to strip breakage in a high-speed rolling state.

Based on the above technical problems found, the inventor provides a conveying system and a battery production system after in-depth research. The conveying system includes a press roller. The number and positions of hollow rubber rollers included in the press roller can be adjusted. Widths and outer diameters of the hollow rubber rollers can be combined, which enhances adaptability of the press roller and the sheets, can improve the sheet conveying quality, reduce the maintenance cost of the conveying system and improve the universality of the conveying system. It is worth noting that the conveying system is suitable for conveying any kind of sheets, especially for conveying sheets similar to battery pole pieces. To facilitate understanding, the conveying system of the present application is described with a pole piece of a battery as an example. The present application is described below in combination with specific embodiments.

Figure 2:
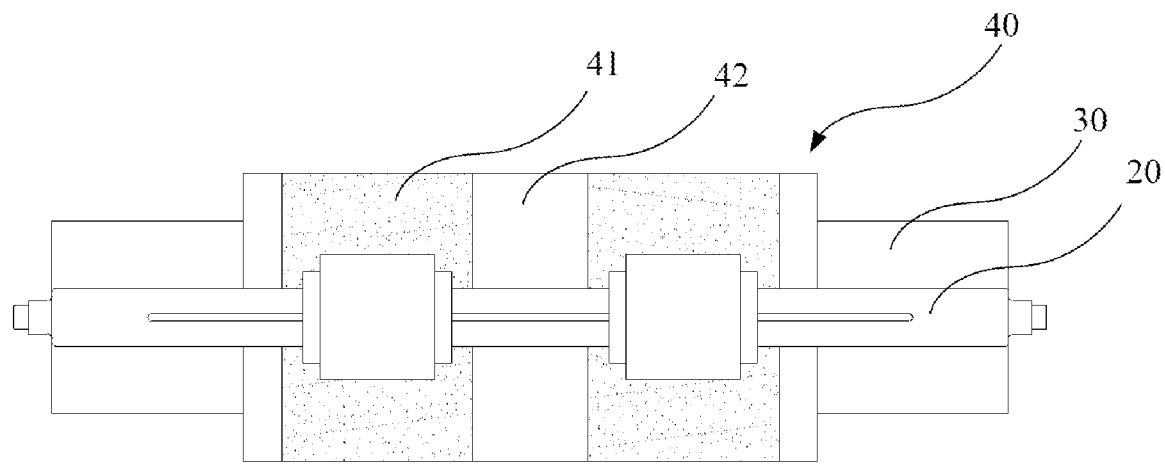
FIG. 2 is a structural schematic diagram of a conveying system according to some embodiments of the present application.

Referring to FIG. 2, the embodiment of the present application provides a conveying system 10 used for sheet conveying. The conveying system 10 includes a driving roller 30 making contact with a sheet; and a press roller 20 arranged correspondingly to the driving roller 30, where the press roller 20 abuts against at least part of the surface of the sheet facing away from the driving roller 30, and presses the sheet against the driving roller 30.

Figure 3:
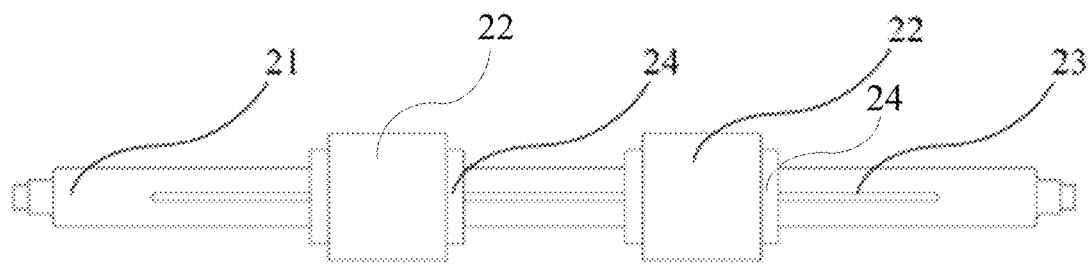
FIG. 3 is a schematic structural diagram of a press roller according to some embodiments of the present application.
Figure 4:
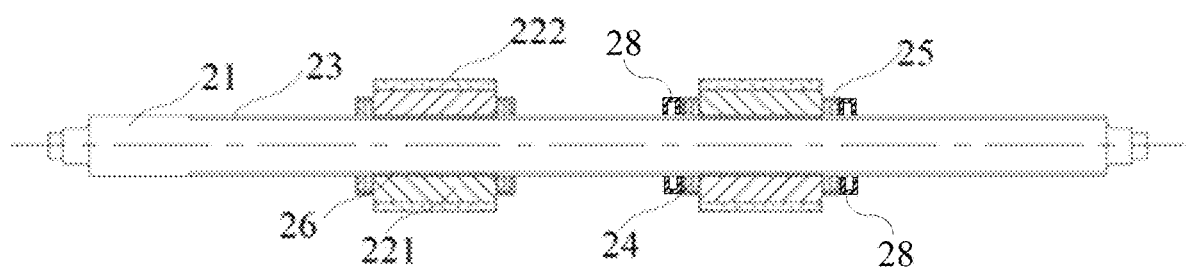
FIG. 4 is a cross-sectional view of a press roller according to some embodiments of the present application.
Figure 5:
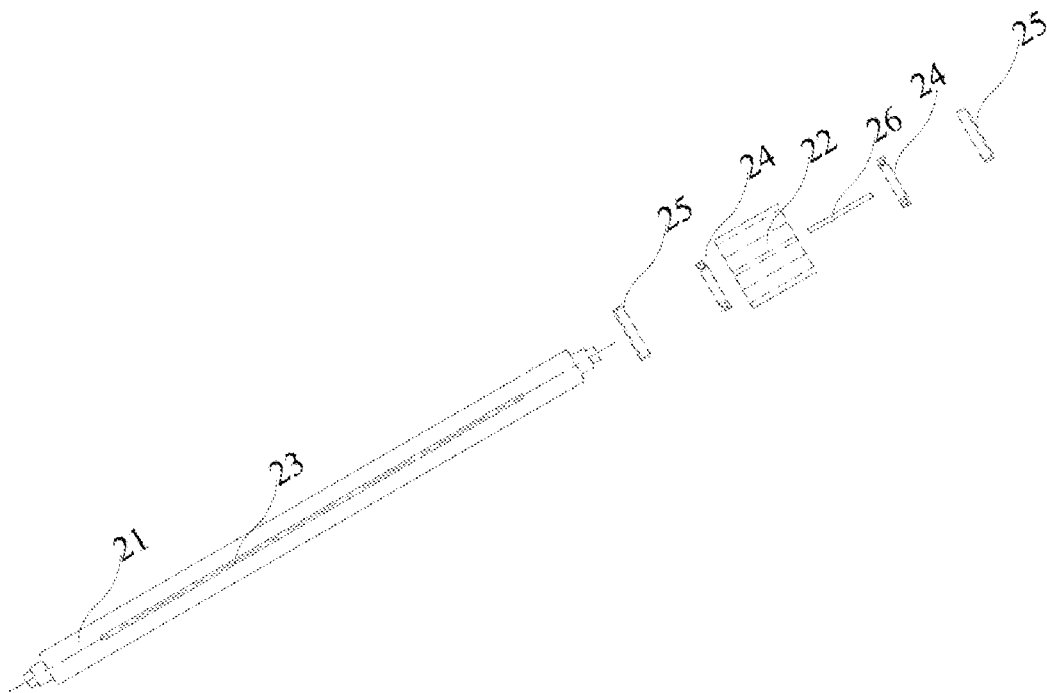
FIG. 5 is an exploded view of a press roller according to some embodiments of the present application.

Referring to FIG. 3, FIG. 4 and FIG. 5, the press roller 20 includes: a main shaft 21 with a central axis; at least one hollow rubber roller 22 detachably sleeving the main shaft 21; and at least one pair of fixing clamp rings 24 arranged on two sides, along the central axis, of the hollow rubber rollers 22 so as to fix positions of the hollow rubber rollers 22 on the main shaft 21 along the central axis, where an outer diameter of each fixing clamp ring 24 is less than that of the corresponding hollow rubber roller 22.

It can be understood that the sheet may be any kind of sheet with a material, a specification, a size, and a layout not limited. In some embodiments, the sheet is a battery pole piece 40 which includes membranes 41 coated with an electrode active material and an empty foil area 42 not coated with an active material.

At least one hollow rubber roller 22 means that there may be one, two or more hollow rubber rollers 22. Each hollow rubber roller 22 means that an interior of the rubber roller is of a hollow structure communicating with an exterior, and each hollow rubber roller 22 can sleeve the main shaft 21 through the hollow structure. In some embodiments, the number and positions of the hollow rubber rollers 22 correspond to the number and positions of the membranes 41. In some embodiments, a width of the hollow rubber rollers 22 is smaller than that of the membranes 41 and greater than ⅔ of the width of the membranes 41. In some embodiments, a width of the hollow rubber rollers 22 is smaller than that of the membranes 41 and greater than ⅘ of the width of the membranes 41. Through the above setting, action areas of the hollow rubber rollers 22 on the membranes 41 can be maximized, at the same time, the effect of the press roller 20 on the empty foil area 42 and the edges of the membranes 41 can be eliminated, and the damage of the press roller to the pole piece 40 can be reduced. A risk of strip breakage during cold-press rolling of the pole piece 40 with concave-convex points generated due to dirt on the hollow rubber rollers 22, especially dirt on areas, corresponding to the empty foil area 42, of the hollow rubber rollers 22 is effectively avoided, thereby guaranteeing the battery production quality.

According to the conveying system 10 in the above embodiment, the number and the positions of the hollow rubber rollers 22 included in the press roller 20 can be adjusted, and the width and the outer diameter of the hollow rubber rollers 22 can be combined, which enhances the adaptability between the press roller 20 and the sheet. The matching of the hollow rubber rollers 22 and the specification of the sheet reduces the damage caused by the press roller 20 to a specific area of the sheet, also improves the universality of the conveying system 10 when different types and specifications of sheets are conveyed, and widens the application range of the conveying system 10; and at the same time, the hollow rubber rollers 22 are detachable, which facilitates the replacement and rapid assembly of the press roller, reduces the replacement cost, reduces the maintenance cost of the conveying system 10, and prolongs service life of the conveying system 10.

In addition, in some embodiments, a surface of each hollow rubber roller 22 is coated with a rubber layer, which has certain elasticity, and can adjust a degree of pressing the sheet against the driving roller 30. Compared with the integrated press roller 200 shown in FIG. 1, the conveying system 10 according to the above embodiment also obviously reduces the maintenance cost of overall grinding and rubber lagging. Specifically, after a surface of the integrated press roller 200 is abraded to a certain degree, it is necessary to grind the whole integrated press roller 200 to remove the rubber layer or to perform rubber lagging on the integrated press roller 200 to form a new rubber layer on the outer surface. Compared with the integrated press roller 200, grinding or rubber lagging treatment only needs to be performed on the to-be-maintained hollow rubber rollers 22 of the press roller 20 in the present application, and thus the maintenance cost of grinding and rubber lagging is obviously reduced.

Referring to FIG. 2, FIG. 4 and FIG. 5, in some embodiments, the conveying system 10 further includes a fastener. The fastener includes: at least one main shaft groove 23 formed in an outer circumferential surface of the main shaft 21 and extending along the central axis; at least one rubber roller groove (not shown in the figures) formed in an inner circumferential surface of the hollow rubber roller 22; and at least one key 26 clamped in the main shaft grooves 23 and the rubber roller grooves so as to limit the rotation of the hollow rubber rollers 22 relative to the main shaft 21.

It can be understood that at least one main shaft groove 23, at least one rubber roller groove and at least one key 26 mean that the number of main shaft grooves 23, rubber roller grooves and keys 26 may be one, two or more.

In some embodiments, as shown in FIG. 4, the two main shaft grooves 23 are symmetrically formed in the outer circumferential surface of the main shaft 21 and extend along the central axis of the main shaft 21: the two rubber roller grooves are symmetrically formed in the inner circumferential surfaces of the hollow rubber rollers 22 (not shown in the figure); and the two keys 26 are clamped in the two symmetrically-arranged main shaft grooves 23 and the corresponding rubber roller grooves respectively.

A key-groove matching structure of the fastener ensures stable radial connection between the hollow rubber rollers 22 and the main shaft 21, also facilitates the assembly and cooperation between the main shaft 21 and the hollow rubber rollers 22, facilitates quick switching of press roller types, and improves transformation efficiency. Specifically, the key-groove matching structure facilitates quick disassembly and replacement of the hollow rubber rollers 22, and therefore facilitates rapid increase or decrease or replacement of the hollow rubber rollers 22 on the main shaft 21, such as increasing hollow rubber rollers 22 the same size as the existing hollow rubber rollers 22 on the main shaft 21, or replacing the hollow rubber rollers 22 on the main shaft 21 with other hollow rubber rollers 22 of different sizes. In addition, since the hollow rubber rollers 22 can slide along the main shaft 21 and be fixed to any proper position by the keys 26, the positions of the hollow rubber rollers 22 on the main shaft 21 can be conveniently adjusted as required.

Figure 6:
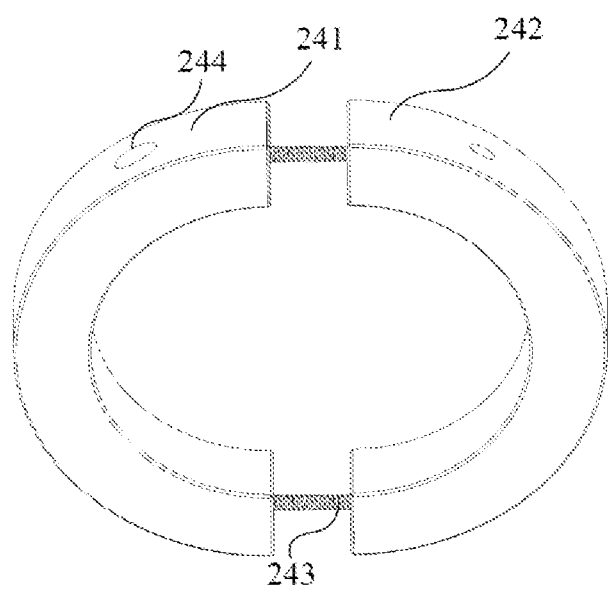
FIG. 6 is a structural schematic diagram of a fixing clamp ring according to some embodiments of the present application.

Referring to FIG. 6, in some embodiments, each fixing clamp ring 24 includes a first half-ring part 241, a second half-ring part 242 and fastening bolts 243, where the fixing clamp ring 24 is defined by the first half-ring part 241 and the second half-ring part 242, and the fastening bolts 243 are used for connecting the first half-ring part 241 with the second half-ring part 242.

In some embodiments, adjacent parts of the first half-ring parts 241 and the second half-ring parts 242 are provided with threaded holes 244 matched with the fastening bolts 243.

The fixing clamp rings 24 guarantee stable connection of the hollow rubber rollers 22 and the main shaft 21 in a direction of the central axis, and further ensure rotation stability of the press roller 20 during operation. The first half-ring parts 241 and the second half-ring parts 242 are fixed by the fastening bolts 243, which can facilitate disassembly and assembly of the fixing clamp rings 24, thereby improving the assembly efficiency of the press roller 20.

Referring to FIG. 4 and FIG. 5, in some embodiments, the press roller 20 further includes: first protective enclosures 25. Each first protective enclosure 25 includes a circumferential part covering an outer circumferential surface of the corresponding fixing clamp ring 24 and a radial part covering the side surface of the fixing clamp ring 24 facing away from the corresponding hollow rubber roller 22, where the circumferential part abuts the side surface of the hollow rubber roller 22, and the radial part abuts the outer circumferential surface of the main shaft 21. In some embodiments, the press roller 20 further includes second protective enclosures 28, and the second protective enclosures 28 sleeve the main shaft 21 at one or more positions that are not in contact with the hollow rubber roller 22 and are provided with the main shaft groove 23. In some embodiments, the press roller 20 includes the first protective enclosures 25 and the second protective enclosures 28 at the same time.

In some embodiments, the first protective enclosures 25 and the second protective enclosures are made of flexible sealing materials, so as to further improve sealing protection performance. In some embodiments, the first protective enclosures 25 and the second protective enclosures are made of silica gel.

The first protective enclosures 25 and/or the second protective enclosures can avoid a situation that dust and other pollutants enter the main shaft grooves 23 and the rubber roller grooves, as a result, influence operation efficiency, and shorten service life of the press roller 20 and the conveying system 10. At the same time, the first protective enclosures 25 are arranged on peripheries of the fixing clamp rings 24 to improve sealing performance of the fixing clamp rings 24. The second protective enclosures are arranged on the main shaft grooves 23 to prevent impurities from falling into the main shaft grooves 23 and affecting the assembly of the keys 26.

In some embodiments, the press roller 20 includes multiple groups of hollow rubber rollers 22 different in outer diameter. In some embodiments, the multiple groups of hollow rubber rollers 22 are different in width.

It can be understood that each group of the multiple groups of hollow rubber rollers 22 includes one or more hollow rubber rollers 22 with the same outer diameter and/or the same width, but different groups of hollow rubber rollers 22 can have different outer diameters and/or different widths.

The multiple groups of hollow rubber rollers 22 with different outer diameters and/or widths can increase adaptability of the press roller 20 and the conveying system 10 to different types and specifications of sheets, and enlarge the application range of the conveying system 10. Specifically, for the specific pole piece 40, a matched group of hollow rubber rollers 22 can be used, and when the conveyed pole piece 40 changes (for example, a thickness of the pole piece 40 changes, and a width of membranes 41 changes), another matched group of hollow rubber rollers 22 can be adopted through replacement.

In some embodiments, as shown in FIG. 4, each hollow rubber roller 22 includes an inner-ring part 221 and an outer-ring part 222, and the outer circumferential surface of the inner-ring part 221 is detachably sleeved with the outer-ring part 222.

In some embodiments, the outer-ring parts 222 of the hollow rubber rollers 22 are made of rubber materials. The rubber materials have relatively high friction force, which can improve a conveying effect of the press roller 20 and reduce damage to the sheets. Furthermore, in some embodiments, the outer-ring parts 222 of the hollow rubber rollers 22 are made of an EPDM material, and the EPDM material has relatively high friction force, which can press the hollow rubber rollers 22 onto the driving roller 30.

The outer-ring parts 222 of the hollow rubber rollers 22 are detachable, which facilitates replacement of surface parts of the hollow rubber rollers 22, and reduces the maintenance cost, and different outer-circle materials can be selected according to different types of sheets, which improves universality of the press roller 20 and the conveying system 10.

In some embodiments, the conveying system 10 further includes a distance adjustment mechanism 29 (shown in FIG. 8), and the distance adjustment mechanism 29 is connected to the press roller 20 and adjusts a distance between the press roller 20 and the driving roller 30 so as to adjust a pressure applied by the press roller 20 to a to-be-conveyed sheet.

The distance adjustment mechanism 29 can further improve universality of the conveying system 10 so as to be matched with conveying of different types of sheets and more effectively matched with adjustment of tensity of a battery pole piece production technology. Specifically, when the thickness of the sheet is large, the distance adjustment mechanism 29 increases the distance between the driving roller 30 and the press roller 20 to prevent damage to the sheet due to excessive pressure; and when the thickness of the sheet is small, the distance adjustment mechanism 29 reduces the distance between the driving roller 30 and the press roller 20 to ensure effective friction force between the sheet and the press roller 20, thereby ensuring the conveying quality of the sheet.

Figure 7:
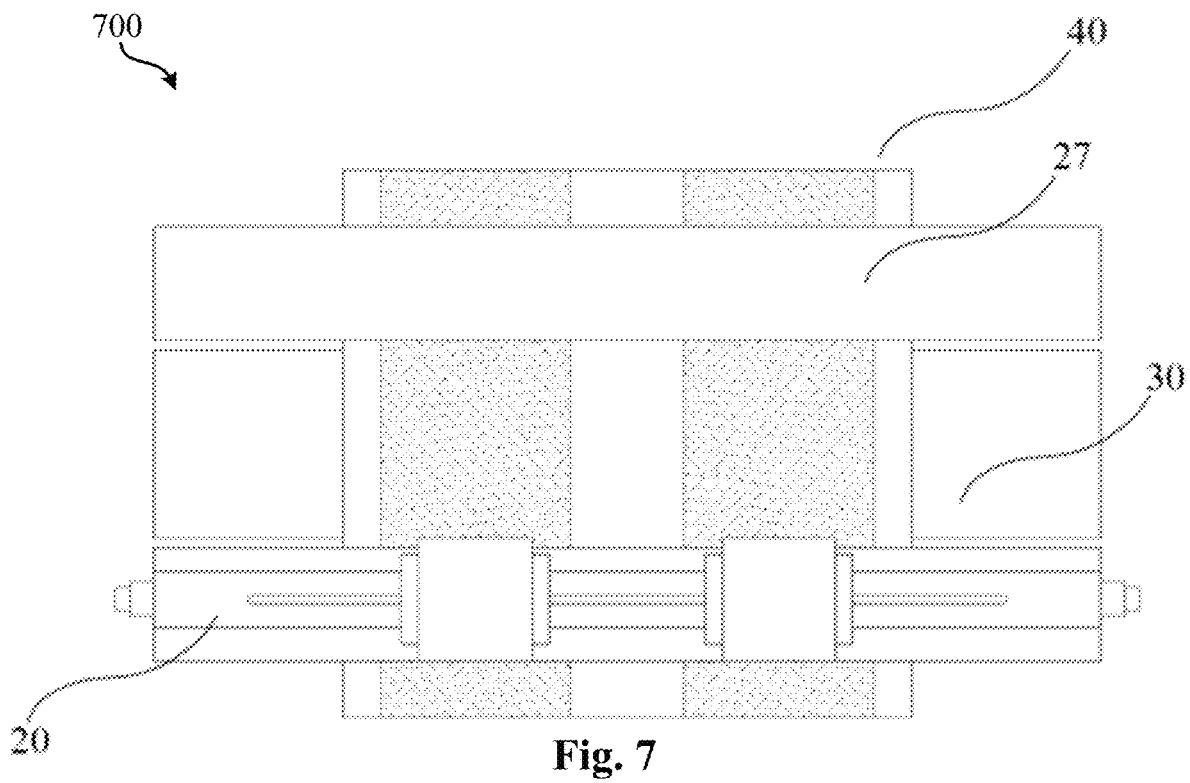
FIG. 7 is a top view of a battery production system including a conveying system according to some embodiments of the present application.
Figure 8:
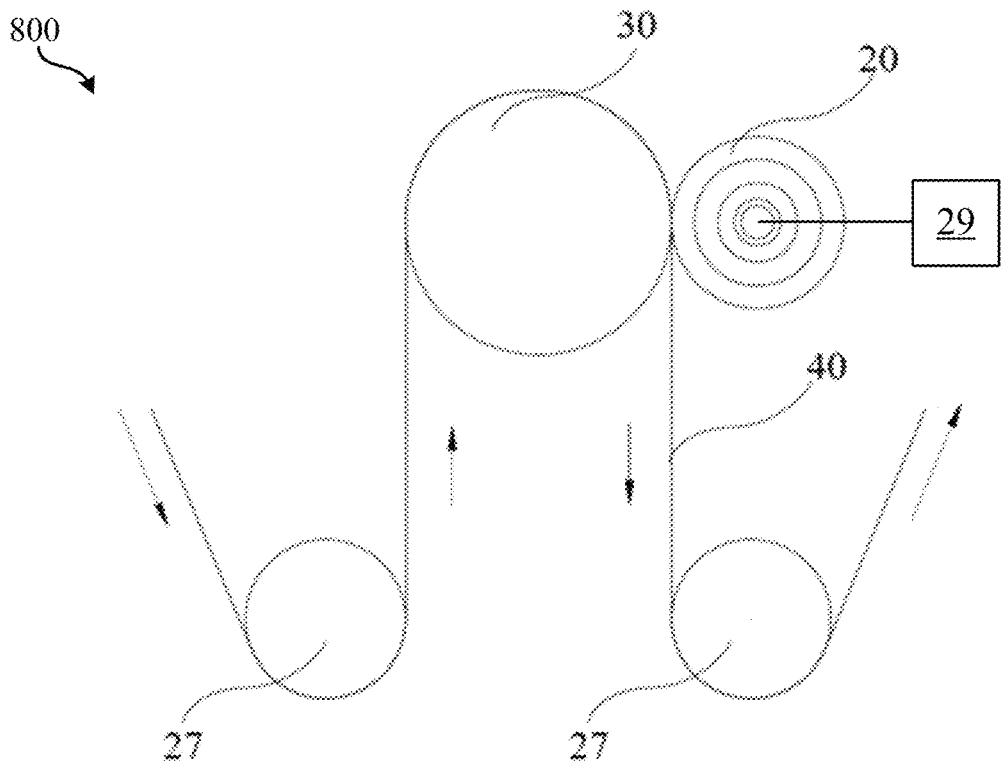
FIG. 8 is a side view of a battery production system including a conveying system according to some embodiments of the present application.

FIG. 7 shows an example of a battery production system 700 including the conveying system 10. FIG. 8 shows another example of a battery production system 800 including the conveying system 10. Referring to FIG. 7 and FIG. 8, in some embodiments, the conveying system 10 further includes at least one bypass roller 27 arranged upstream and/or downstream of the driving roller 30 and the press roller 20 in a sheet conveying direction.

The upstream or downstream bypass roller 27 can be matched with the conveying system 10 to isolate tension of the sheet before and behind action points of the three parts. When the conveyed sheet is the pole piece, the adjustment of the tensity of the battery pole piece production technology can be effectively matched.

In some embodiments, the diameter of the driving roller 30 is greater than that of the hollow rubber roller 22.

The driving roller 30 serving as an active roller has the larger diameter than the hollow rubber rollers 22 serving as driven rollers, which can guarantee a large contact area between the sheet and the driving roller 30, make large friction force generated between the sheet and a circumferential surface of the driving roller 30, and ensure balanced stress of the sheet, thereby stably conveying the sheet. By contrast, the hollow rubber rollers 22 serving as the driven rollers are set to have the small diameter, which can reduce a weight of the hollow rubber rollers 22 and reduce a contact area between the sheet and the hollow rubber rollers 22, thereby ensuring that the hollow rubber rollers 22 press the sheet against the driving roller 30 and meanwhile producing small resistance to conveying.

In a specific embodiment, a conveying system 10 includes: a press roller 20 and a driving roller 30. The press roller 20 and the driving roller 30 are arranged correspondingly, make contact with two sides of a pole piece 40 respectively, and drive the pole piece 40 under the action of friction force. The pole piece 40 includes membranes 41 coated with an electrode active material and an empty foil area 42 not coated with an active material. The press roller 20 includes: a main shaft 21, two hollow rubber rollers 22, a fastener and two pairs of fixing clamp rings 24: the main shaft 21 has a central axis: the hollow rubber rollers 22 detachably sleeve the main shaft 21 and are fixed to the main shaft 21 through the fastener in a radial direction, and the hollow rubber rollers 22 are placed on the membranes 41; and an outer diameter of the fixing clamp rings 24 is smaller than that of the hollow rubber rollers 22, and each pair of fixing clamp rings 24 is arranged on two sides, along the central axis of the main shaft, of the corresponding hollow rubber roller 22 so as to fix the position of the corresponding hollow rubber roller 22 on the main shaft 21 along the central axis. The fastener includes: main shaft grooves 23 symmetrically formed in an outer circumferential surface of the main shaft 21 and extending along the central axis of the main shaft: rubber roller grooves (not shown) symmetrically formed in an inner circumferential surface of the hollow rubber roller 22; and keys 26 clamped in the main shaft grooves 23 and the rubber roller grooves so as to limit the rotation of the hollow rubber rollers 22 relative to the main shaft 21. The press roller 20 further includes first protective enclosures 25. Each first protective enclosure 25 includes a circumferential part covering an outer circumferential surface of the corresponding fixing clamp ring 24 and a radial part covering the side surface of the fixing clamp ring 24 facing away from the corresponding hollow rubber roller 22, where the circumferential part abuts the side surface of the corresponding hollow rubber roller 22, and the radial part abuts the outer circumferential surface of the main shaft 21.

Each fixing clamp ring 24 includes a first half-ring part 241, a second half-ring part 242 and fastening bolts 243, where adjacent parts of the first half-ring part and the second half-ring part are provided with threaded holes 244 matched with the fastening bolts 243, the fixing clamp ring 24 is defined by the first half-ring part 241 and the second half-ring part 242, and the fastening bolts are used for connecting the first half-ring part 241 and the second half-ring part 242. The conveying system 10 further includes bypass rollers 27 arranged on the driving roller 30 and the press roller 20 upstream and downstream in the conveying direction of the pole piece 40, and the bypass rollers 27 and the conveying system 10 form a tension isolation system to cooperate with adjustment on tensity of the pole piece 40.

In some embodiments, the present application provides a battery production system including the conveying system in the above embodiments. The battery production system can improve the battery production quality, reduce the damage caused by the conveying system to battery components in the conveying process, avoid a risk of strip breakage during cold-pressing rolling caused by concave-convex points generated in an empty foil area of a pole piece due to dirt on the rubber rollers in the pole piece conveying process, and improve a yield.

The conveying system and the battery production system in the embodiment of the present application can be used for producing any type of batteries such as a power battery or an energy storage battery: Application scenarios of the power battery include, but are not limited to, vehicles, ships, aircrafts, spacecrafts, electric tools, electric toys, various types of mobile terminals, etc. Application scenarios of the energy storage battery include, but are not limited to, a solar power generation system, a hydroelectric power generation system, a wind power generation system, etc.

It needs to be understood that the above batteries may be any type of batteries suitable for liquid electrolyte solution, and include, but are not limited to: a lithium-ion battery, a lithium metal battery, a lithium-sulfur battery, a lead-acid battery, a nickel-cadmium battery, a nickel metal hydride battery, or a lithium air battery, or the like.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

The invention claimed is:

1. A conveying system used for sheet conveying, comprising:
    a driving roller making contact with a sheet;
    a press roller arranged correspondingly to the driving roller, the press roller abutting against at least part of a surface of the sheet facing away from the driving roller and pressing the sheet against the driving roller, wherein the press roller comprises:
    a main shaft with a central axis;
    a plurality of hollow rubber rollers detachably sleeving the main shaft and distanced from each other along the central axis, wherein an interior of each rubber roller is of a hollow structure communicating with an exterior; and
    at least one pair of fixing clamp rings arranged on two sides of each hollow rubber roller along the central axis so as to fix a position of the hollow rubber roller on the main shaft along the central axis, and an outer diameter of the fixing clamp ring is less than that of the hollow rubber roller; and
    first protective enclosures each comprising a circumferential part covering an outer circumferential surface of a corresponding fixing clamp ring and a radial part covering the side surface of the fixing clamp ring facing away from each hollow rubber roller, wherein a circumferential part abuts against the side surface of the hollow rubber roller, and a radial part abuts against the outer circumferential surface of the main shaft.

2. The conveying system according to claim 1, wherein the conveying system further comprises a fastener, and the fastener comprises:
    at least one main shaft groove formed in an outer circumferential surface of the main shaft and extending along the central axis;
    at least one rubber roller groove formed in an inner circumferential surface of the hollow rubber roller; and
    at least one key clamped in the main shaft groove and the rubber roller groove so as to limit a rotation of the hollow rubber roller relative to the main shaft.

3. The conveying system according to claim 1, wherein each fixing clamp ring comprises a first half-ring part, a second half-ring part and fastening bolts, the fixing clamp ring is defined by the first half-ring part and the second half-ring part, and the fastening bolts are used for connecting the first half-ring part and the second half-ring part.

4. The conveying system according to claim 1, wherein the press roller further comprises:
    second protective enclosures which sleeve the main shaft at one or more positions that are not in contact with the hollow rubber roller and are provided with the main shaft groove.

5. The conveying system according to claim 1, wherein each hollow rubber roller comprises an inner-ring part and an outer-ring part, and the outer circumferential surface of the inner-ring part is detachably sleeved with the outer-ring part.

6. The conveying system according to claim 1, further comprising at least one bypass roller arranged upstream and/or downstream of the driving roller and the press roller in a sheet conveying direction.

7. The conveying system according to claim 1, wherein the diameter of the driving roller is greater than that of each hollow rubber roller.

8. The conveying system according to claim 1, wherein the sheet comprises a plurality of membranes respectively corresponding to the plurality of hollow rubber rollers, and a width of each hollow rubber roller is smaller than a width of each corresponding membrane and greater than $2/3$ of the width of the corresponding membrane along the central axis.

* * * * *